United States Patent
Ju

(10) Patent No.: US 6,944,792 B2
(45) Date of Patent: Sep. 13, 2005

(54) METHOD FOR VERIFYING USER MEMORY VALIDITY IN OPERATING SYSTEM

(75) Inventor: Cheol Min Ju, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 610 days.

(21) Appl. No.: 09/917,723

(22) Filed: Jul. 31, 2001

(65) Prior Publication Data

US 2002/0016940 A1 Feb. 7, 2002

(30) Foreign Application Priority Data

Jul. 31, 2000 (KR) ......................................... 2000-44184

(51) Int. Cl.[7] .............................................. G06F 11/00
(52) U.S. Cl. .............................. 714/25; 714/53; 714/42
(58) Field of Search ............................... 714/25, 42, 53

(56) References Cited

U.S. PATENT DOCUMENTS

| | | | | |
|---|---|---|---|---|
| 4,903,194 A | * | 2/1990 | Houdek et al. | 714/53 |
| 5,586,253 A | * | 12/1996 | Green et al. | 714/53 |
| 6,047,388 A | * | 4/2000 | Bashore et al. | 714/38 |
| 6,098,190 A | * | 8/2000 | Rust et al. | 714/763 |
| 6,282,657 B1 | * | 8/2001 | Kaplan et al. | 713/201 |
| 6,457,067 B1 | * | 9/2002 | Byers et al. | 710/3 |
| 6,738,882 B1 | * | 5/2004 | Gau | 711/170 |

* cited by examiner

*Primary Examiner*—Robert Beausoliel
*Assistant Examiner*—Yolanda L Wilson
(74) *Attorney, Agent, or Firm*—Fleshner & Kim, LLP

(57) ABSTRACT

A method for verifying user memory validity which copes with faults generated in the Kernel area by returning an error value, even if the fault is generated by a user buffer address checking function declared as a safeguard function. The user memory verifies validity by simple memory reading/writing functions, thus increasing processing speed. Faults generated in the Kernel area can be processed using the safeguard function. The method can be applied in communication devices and to all OS (Operating System) in which the user address area is the same as the address area of the current process and all processes and tasks are performed on the same address area.

29 Claims, 2 Drawing Sheets

METHOD FOR VERIFYING USER MEMORY VALIDITY IN OPERATING SYSTEM

BACKGROUND OF THE INVENTION

1. Field of the Invention

The invention relates to an operating system which can be embedded in communications equipment.

2. Background of the Related Art

Generally, an OS (Operating System) provides various high level functions so that various software operations may be managed and performed effectively. In addition, the OS performs services for user processes generated in respective application programs through a Kernel real-time multi-managing system which manages resources, such as a disk, a printer, a terminal, or communication equipment.

When a user process generates a system call requiring OS service while operating a user program, the Kernel in the OS accesses an address area where data can be exchanged with the user process, and the OS then executes read/write functions with the data in order to exchange the data with the user processes. However, before the process is performed, the OS verifies the user memory validity in order to ensure the stability of the system operation and to protect Kernel resources from user access errors. In other words, if a real page is already allocated in the address area accessed by the OS as user memory, the address area cannot be used as the user memory, thus the validity of the user memory should be verified before the OS begins to exchange data.

Related art computer systems have OS where the address areas of the Kernel and of the user are different from each other. However, the OS installed on communications equipment coexists with the user area in a parallel address area. Therefore, if the Kernel accesses the memory area of the user in this OS environment, the Kernel is able to directly access the memory area without changing the address area. In other words, the Kernel is able to access the memory area without changing MMU (Memory Management Unit) data.

FIG. 1 is a schematic diagram of a related art OS provided for a user process. The related art user process of FIG. 1 includes text, data, heap, and stack areas in the memory, and the user process performs a system call in order to receive Kernel service from the OS. If the called user process requires an OS function, the virtual address area of the user buffer is transmitted to the Kernel. At that time, a memory error in the user process may generate a fatal error in the Kernel. Therefore, in order to prevent such an error, the Kernel determines whether the address of the user buffer is valid.

As described above, in order to ensure system stability, the OS protects the resources of the Kernel from an access error via a user using memory protection process. Generally, the Kernel assumes that any user may make an error and provides memory protection service to each user. Therefore, the data area of each user (buffer) goes through the validity verifying process before being used in the Kernel. A first related art method for verifying the validity of memory areas consists of searching the memory management structure allocated to the user application by the OS. A second related art method of verifying memory validity consists of searching an MMU structure by changing a virtual address into a real address.

To verify memory validity by searching an allocated memory management structure, when the user application asks the OS for permission to use the memory, the OS stores and manages the information in the memory in a certain structure set as a virtual address. The structure stores a start address number and the size of the allocated memory, in addition to the real memory information, and therefore the validity of the allocated memory is determined by searching the structure.

The first related art memory validity verification method is suitable for cases where the number of searched structures is small because the allocation form of the memory is simple. However, in the case of a telecommunication system in which the allocation and termination of the memory happens frequently due to the nature of the telecommunication protocol, the first related art memory validity verification method is not suitable because the number of executed searches, where Log N:N designates the size of the entire structure, becomes larger.

The second related art memory validity verification method is divided into a software based search, and a hardware based search in which the MMU hardware performs all searching functions automatically. The software based search allows the real address searching to be freely constructed by the developer of the OS, but it may affect the OS functioning. The hardware based search can be done by either a table lookup search, a hashing search, or a segment search method.

For the hardware based search, the table lookup method of searching stores mapping information in a table form, which implements the memory mapping information. In addition, the table area which is mapped is searched successively. The hashing method of searching is a method by which the structure is searched by changing the address using a certain hash function. The searching speed of this method is the fastest. However, the hashing method is complex due to the hash function and the size of the bucket. The complexity is further increased due to the overhead in case the corresponding structure is not found in the first bucket, whereby a secondary bucket should be used to find the corresponding structure. Such complexity increases the time to complete a hash method search.

The segment method of searching is advantageous for certain types of searches because of the difficulties with mapping a plurality of memories. The segment method is performed similarly to the page method of searching in accordance with applied processors.

As described above, problems with the conventional methods for verifying memory validity are due to the functioning of the method being varied by the hardware structure implementing the search, and the complexity of the search algorithym reducing the verifying speed. In addition, when a fault or a conflict is generated by a memory error in the Kernel, the OS is unable to respond appropriately and crashes or locks-up.

SUMMARY OF THE INVENTION

An object of the invention is to solve at least the above problems and/or disadvantages and to provide at least the advantages described hereinafter.

Another object of the invention is to provide a method for verifying user memory validity in an OS by a simple memory approach, and which is capable of dealing with a panic status generated in the Kernel area.

Another object of the invention is to provide a simplified method for verifying the validity of user memory in an OS.

Another object of the invention is to provide a method of verifying the validity of user memory in an OS which does not lock-up or crash the OS when a memory error is discovered.

Another object of the invention is to provide a method for verifying user memory validity and a method for processing a fault in the Kernel area which may be generated during the process of verifying memory validity.

Another object of the invention is to provide a method for verifying user memory validity which is suitable for an OS environment in which the OS address area and the address area of user application are parallel, that is, the OS is able to access the address area of user application which is being operated without additionally changing the address.

Another object of the invention is to provide a method for processing a fault in the Kernel area which can be embodied in a general OS environment, and is not limited to a specific OS environment.

Another object of the invention is to provide a method for verifying user memory validity which includes performing a system call and declaring validity checking function as a safeguard, identifying whether the validity checking function is declared as the safeguard by calling an exception processor if the user memory area is not valid, calling a safeguard exception processor and identifying an identifier of the safeguard exception processor if the validity checking function is in the safeguard area, recognizing that the subject of the process is the validity checking function by the safeguard exception processor, and identifying whether the function is defined in the system through the identifier of the safeguard, and processing the validity checking function as defined in the system which performs the process of the function, if the validity checking function is defined in the system.

To achieve these and other objects, there is provided a method for verifying user memory validity in an OS according to embodiments of the invention including the steps of performing a system call and declaring a certain code area (function) as a safeguard, detecting the user buffer validity by using the user buffer address checking function declared as the safeguard, identifying whether the user buffer address checking function is declared as the safeguard by calling an exception processor if the user buffer address area is not valid, identifying an identifier of the safeguard by calling the safeguard exception processor when the user buffer address checking function is identified as, the function in the safeguard area, identifying whether the user buffer checking function is defined in the system by identifying the safeguard identifier, and returning the error value to the user process if the user buffer address checking function is defined in the system.

Another object of the invention to provide a computer-readable medium having stored thereon a sequence of instructions which, when executed by a processor, cause the processor to at least perform the steps of generating a system call, declaring a safeguard function, verifying validity of a user buffer using a user buffer address checking function declared as the safeguard function, determining whether the user buffer address checking function is declared as the safeguard function by calling an exception processor, if the user buffer address area is not valid, establishing an identifier of the safeguard function by calling a safeguard exception processor, if the user buffer address checking function is identified as a function in the safeguard area, confirming whether the user buffer address checking function is defined in the system by identifying the safeguard function identifier, and returning an error value to the user process if the user buffer address checking function is defined in the system.

The foregoing and additional advantages, objects, and features of the invention will be set forth in part in the detailed description of the invention which follows, when taken in conjunction with the accompanying drawings and in part will become apparent to those having ordinary skill in the art upon examination of the following, or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
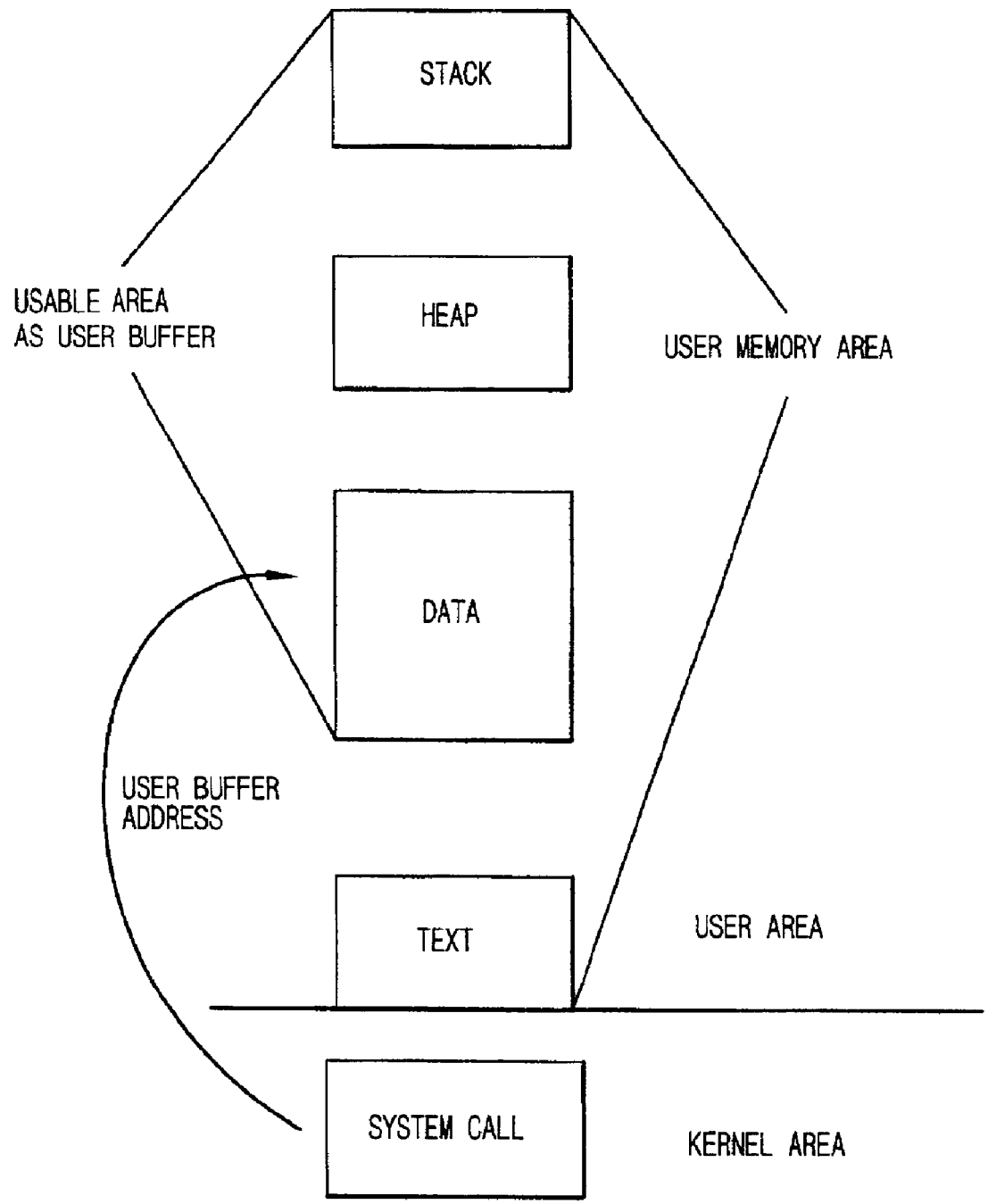
FIG. 1 is a schematic diagram of a related art OS provided for a user process.
Figure 2:
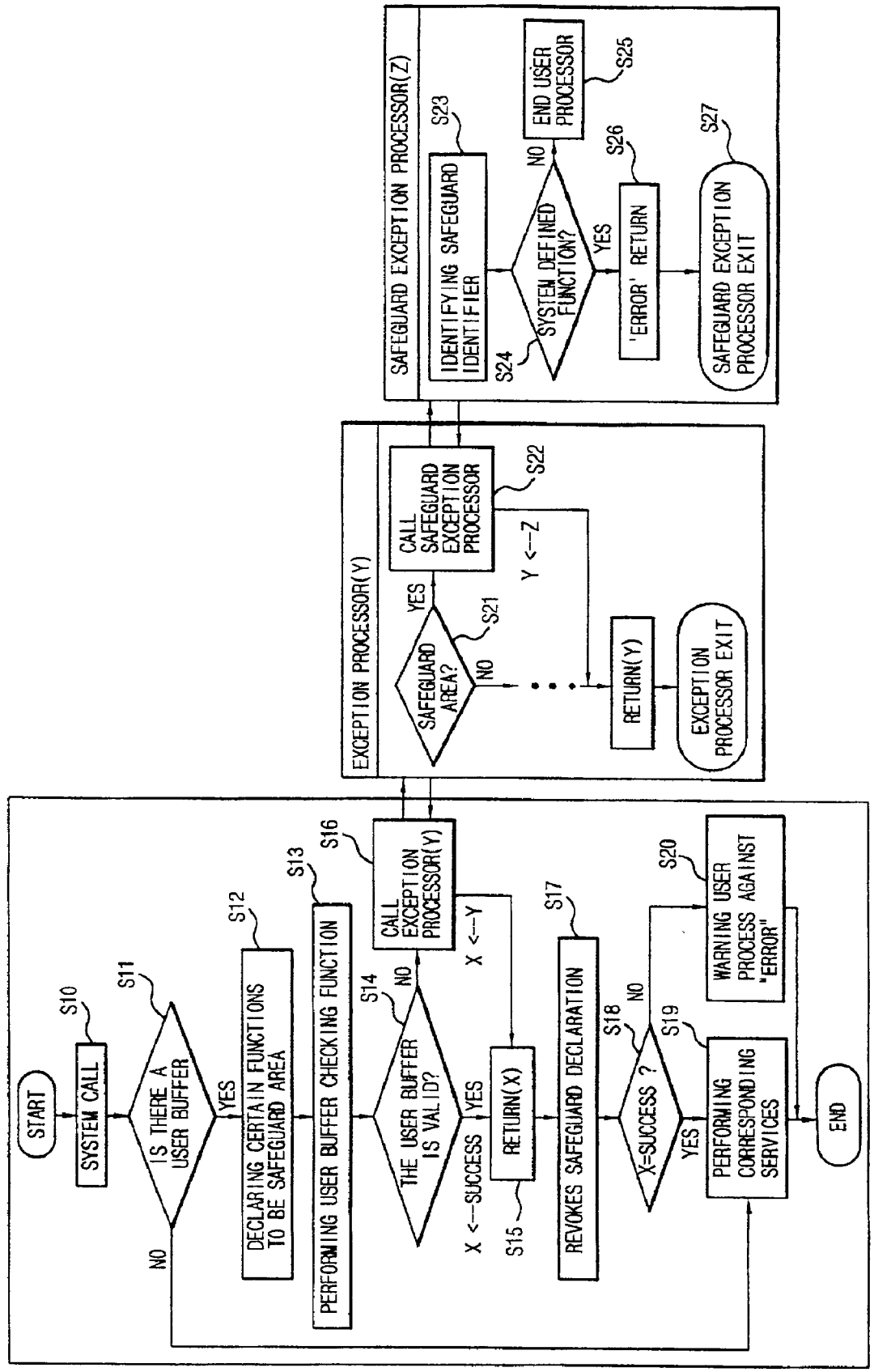
FIG. 2 is a flow chart of a method for verifying user memory validity in an OS according to an embodiment of the invention.

FIG. 2 is a flow chart showing a method for verifying a user memory validity in an OS according to an embodiment of the invention. The invention includes the kernel executing read/write functions to the real address area and verifying whether the area is valid. To start the memory verification of FIG. 2, in step S10 the user process generates a system call in order to acquire OS service functioning, and in step S11 identifies whether user buffer exists. The reason why kernel identifies existence of user buffer is that not all processes share the memory area.

If a user buffer exists, in step S12 the Kernel declares certain functions as a safeguard in order to verify the validity of the user buffer. The safeguard is a software system structure which ensures the stability of the OS by confining the influences of any fault generated by the Kernel to the corresponding user process or function. The user process is one of applications performed under OS environment.

In step S13, the Kernel calls the user buffer address checking function from those functions located in the area declared as a safeguard. The user buffer address checking function verifies the validity of the user buffer, namely the Kernel detects whether the user buffer has a valid address and whether the user buffer permits the Kernel's access (read or write). The user buffer address checking function comprises a page detecting function and a page accessing function.

The page detecting function detects the presence of a page in the corresponding user buffer using the number and the length of the user buffer address. The page accessing function then determines whether the user buffer is valid by sequential access (read/write) to the address area of the detected page in step S14. The step S13, S14 verifying the validity of a user buffer according to the present invention is performed without using a MMU (Memory Management Unit) Table.

If it is determined that the user buffer is valid in step S14, the Kernel returns a success value for the read/write functions and revokes the declared safeguard in step S15, S17. Alternatively, if it is determined in step S14 that the user buffer is not valid, namely, in case that the user buffer address checking function generates the fault during operation, the Kernel calls the exception processor in step S16. The Exception processor is a processor to treat a fault generated while OS performs a service for user process. In step S21, the exception processor determines whether the user buffer address checking function is one of functions declared as a safeguard. If the user buffer address checking function is a function declared as a safeguard, the Kernel calls the Safeguard exception processor in step S22. The Safeguard exception processor is a processor to treat a fault of function declared as a Safeguard. If the user buffer address checking function is not a function declared as a safeguard, the fault is processed by the exception processor.

When a safeguard exception processor is called, it identifies the safeguard identifier in step S23. The safeguard identifier is an identification number assigned to each safeguard area. By identifying the safeguard identifier, the safeguard exception processor determines the function in which the fault is generated. After that, the safeguard exception processor determines in step S24 whether the user buffer address checking function is a system defined function. If the user buffer address checking function is not one of functions defined by system, the safeguard exception processor interrupts the functioning of the user process in step S25 and exits the user process in step S27. However, if the user buffer address checking function is one of functions defined by system, the safeguard exception processor returns the error value to the user process in step S26 and exits the process in step S27, which ends the operation of system call.

Returning the error value to the user processor in step S22 is a process which depends on the assumption that the fault is generated in the user buffer address checking function. The safeguard exception processor assigns certain processes to the corresponding faults according to errors and faults in the Kernel area. Further, the Kernal processes a fault generated in the Kernal area as a simple error.

The kernel determines in step S18 whether the Return value forwarded from step S14 and S16 is a success value. If the Return value is a success value, the Kernel performs corresponding services for the user process in step S19. If the Return value is not a success value, the kernel gives warning to the user process in step S20.

As described above, a preferred embodiment of the invention verifies user memory validity by simple memory read/write function, thus increasing process speed. In addition, any faults generated in the Kernel area can be easily processed using the safeguard functions.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for verifying user memory validity in an OS (Operating System), comprising:

generating a system call for a user process;

declaring areas containing certain functions as a safeguard function area;

verifying a validity of a user buffer address area using a user buffer address checking function;

if the user buffer address area is not valid, determining whether the user buffer address checking function is a function in the safeguard function area by calling an exception processor;

if the user buffer address checking function is identified as a function in the safeguard function area, identifying a safeguard function area identifier by calling a safeguard exception processor;

identifying whether the user buffer address checking function is defined in the system by identifying the safeguard function area identifier; and returning an error value to the user processor if the user buffer address checking function is defined in the system.

2. The method according to claim 1, further comprising returning a success value to the user processor, and at the same time, revoking the safeguard function declaration if the user buffer address area is valid.

3. The method according to claim 1, further comprising exiting the user processor if the user buffer address checking function is not defined in the system.

4. The method according to claim 1, wherein verifying the validity of a user buffer address area comprises:

detecting a page within the user buffer address area; and determining whether a fault is generated by sequential access (read/write) to the address area of the detected page.

5. The method according to claim 4, wherein verifying the validity of a user buffer address area further comprises accessing via a Kernal the user buffer address area and verifying the validity of the user buffer.

6. The method according to claim 5, wherein the Kewel processes a fault generated in the Kernel area as a simple error.

7. The method according to claim 5, wherein the Kernel uses a safeguard function to process the fault generated in the Kernel area.

8. The method according to claim 1, wherein verifying the validity of a user buffer address area is performed without using a MMU (Memory Management Unit) Table.

9. The method according to claim 1, wherein each area declared as a safeguard function area has a unique identifier.

10. The method according to claim 1, wherein declaring areas containing certain functions as a safeguard function area is performed in response to the system call.

11. A method for verifying user memory validity in an operating system (OS), comprising:

performing a system call for a user process;

declaring a validity checking function as a safeguard function in a safeguard function area;

determining whether a user memory area is valid using the validity checking function;

if the user memory area is not valid, identifying whether the validity checking function is declared as the safeguard function by calling an exception processor;

if the validity checking function is in the safeguard function area, calling a safeguard exception processor;

identifying an identifier of the safeguard function area;

recognizing via the safeguard function area identifier that a subject of the process is the validity checking function and identifying whether the validity checking function is defined in the system; and if the validity checking function is defined in the system, returning an error to the user processor.

12. The method according to claim 11, further comprising returning a success value to the user processor, and at the same time, revoking the safeguard function declaration, if the user memory area is valid.

13. The method according to claim 12, further comprising exiting the user processor when the validity checking function is not defined in the system.

14. The method according to claim 13, further comprising accessing via a Kernal a user memory area and verifying a validity of the user memory.

15. The method according to claim 14, wherein the Kernel treats a fault generated in the Kernel area as a simple error.

16. The method according to claim 14, wherein the Kernel uses the safeguard function in order to process the fault generated in the Kernel area.

17. The method according to claim 11, wherein the validity verifying step is executed without using a MMU (Memory Management Unit) Table.

18. The method according to claim 11, wherein declared safeguard function area includes a unique identifier.

19. The method according to claim 11, wherein declaring a validity checking function as a safeguard function in a safeguard function area is performed in response to the system call.

20. A computer-readable medium having stored thereon a sequence of instructions which, when executed by a processor, cause the processor to at least perform a method comprising:

generating a system call for a user process;

declaring areas containing certain functions as a safeguard area;

verifying validity of a user buffer address area using a user buffer address checking function;

if the user buffer address area is not valid, determining whether the user buffer address checking function is declared as a function in the safeguard function area by calling an exception processor;

if the user buffer address checking function is identified as a function in the safeguard area, identifying a safeguard identifier of the safeguard function area by calling a safeguard exception processor;

confirming whether the user buffer address checking function is defined in the system by identifying the safeguard function area identifier; and returning an error value to the user processor if the user buffer address checking function is defined in the system.

21. The computer-readable medium of claim 20, wherein the sequence of instructions further causes the processor to perform the step of returning a success value to the user processor, and at the same time, revoking the safeguard function declaration if the user memory is valid.

22. The computer-readable medium of claim 20, wherein the sequence of instructions further causes the processor to perform the step of exiting the user processor if the user buffer address checking function is not defined in the system.

23. The computer-readable medium of claim 20, wherein the sequence of instructions further causes the processor to perform the steps of:

detecting a page within the user buffer address area; and determining whether a fault is generated by performing at least one read/write function to the address area of the detected page.

24. The computer-readable medium of claim 23, wherein the step of verifying validity comprises accessing via a Kernel the user buffer address area and verifying the validity of the user buffer.

25. The computer-readable medium of claim 24, wherein the step of verifying validity further comprises processing via the Kernel a fault generated in the Kernel area as a simple error.

26. The computer-readable medium of claim 24, wherein the step of verifying validity further comprises using within the Kernel a safeguard function to process the fault generated in the Kernal area.

27. The computer-readable medium of claim 20, wherein the step of verifying the validity of a user buffer address area is performed without using a memory management table.

28. The computer-readable medium of claim 20, wherein each area declared as a safeguard function area has a unique identifier.

29. The method according to claim 20, wherein declaring areas containing certain functions as a safeguard area is performed in response to the system call.

* * * * *